2,990,814
CONTROL MEANS FOR FLUID-OPERATED
ENGINES PRODUCING ROTARY POWER
Henry Jackson Stretton, Slough, England, assignor to G.
D. Peters & Co., Limited, Slough, England
Filed Mar. 7, 1960, Ser. No. 13,040
13 Claims. (Cl. 121—39)

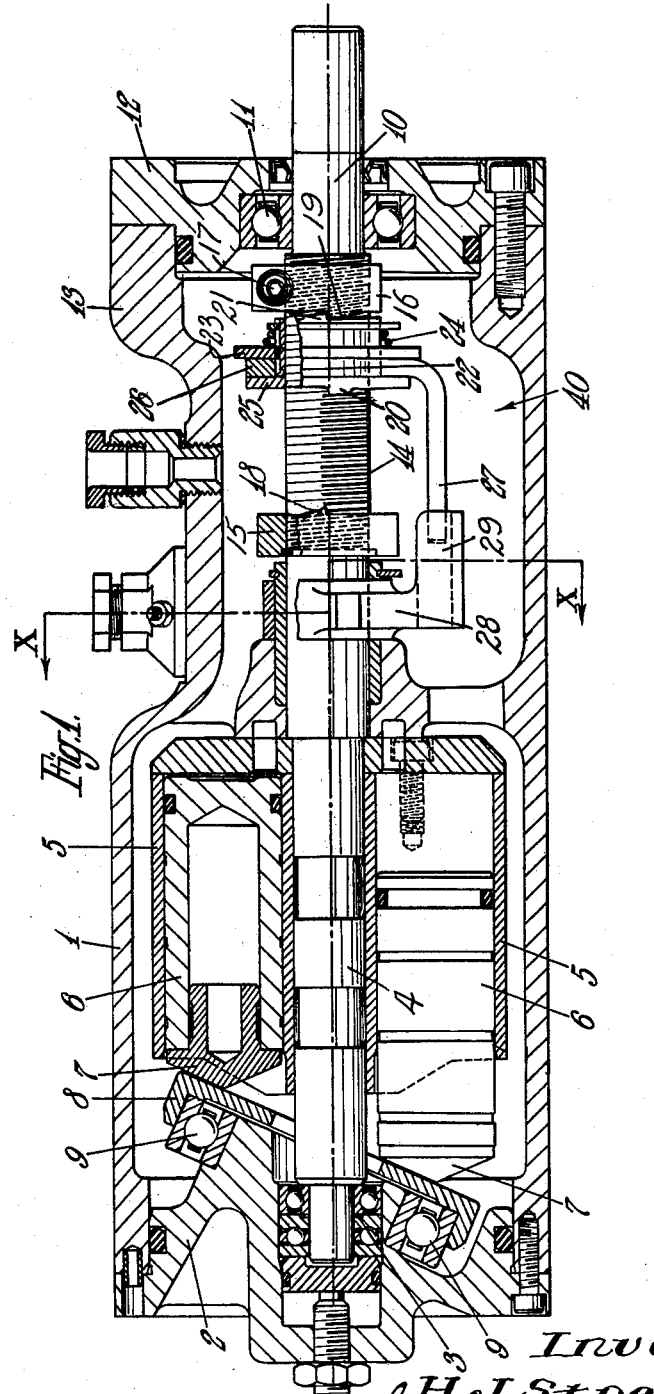

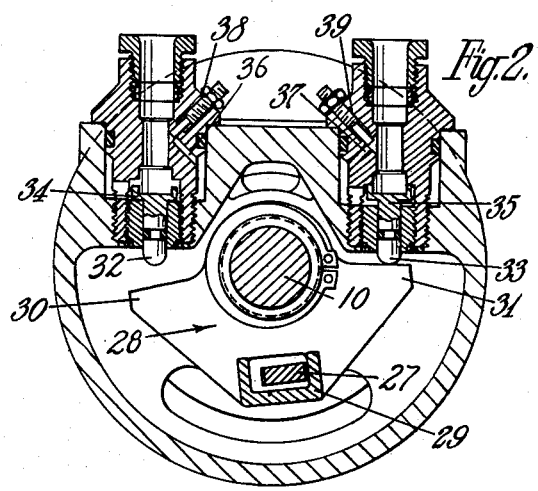

This invention relates to control means for fluid-operated engines producing rotary power, of the kind which are required to operate for a limited number of revolutions in one or either direction and are then brought to rest by suitable control of the operating fluid. Sudden stopping of the engine in these circumstances may give rise to an undesirable shock or impact in the operative parts of the engine or of mechanism driven thereby, and it is the object of the present invention to provide an effective means for eliminating or minimising such conditions.

According to the invention a member driven by the engine is displaceable in accordance with the number of engine revolutions so as to actuate a fluid-controlling valve or valves prior to the stopping of the engine and thereby to cushion or retard operation and decrease the speed of revolution thereof. Such cushioning or retarding is conveniently effected by partial closure of an exhaust or shut-off valve or by providing a restricted by-pass or leak-off in association with an exhaust or shut-off valve which is actuated to closed position. In the preferred form of the invention the displaceable member is arranged to perform such valve actuation after the engine has operated for the desired number of revolutions in each direction.

The invention also consists in an arrangement according to the preceding paragraph in which a threaded shaft driven by the engine causes travel of a nut which is frictionally restrained from rotation by a connection with a displaceable valve-actuating member, such as a rocker, the nut being engageable at the end of its travel with an abutment or abutments on the shaft so that upon such engagement the aforesaid connection is partially rotated to displace the valve actuating member. The abutments are preferably adjustable axially on the shaft so that the period during which the engine runs at full speed may be varied according to requirements. For this purpose the abutments are provided on discs threaded upon the shaft and secured in adjusted position by locking means.

The invention may be applied to any type of fluid-operated engine producing rotary power, including rotary engines, or reciprocating engines such as those of the swash plate type.

In the accompanying drawings:
FIGURE 1 is a longitudinal vertical section of a compressed air engine and control means in accordance with the invention;
FIGURE 2 is a cross section taken on the line X—X of FIGURE 1.

In carrying the invention into effect according to one convenient mode as applied by way of example to a compressed air engine of the swash plate type, which may be of generally known construction, there is provided a casing 1 having an end cover 2 in which is mounted a bearing 3 including radial and thrust bearing elements for supporting one end of a rotary shaft 4. Mounted on the shaft 4 and within the casing 1 are cylinders 5 containing pistons 6 provided with heads 7 which bear on a swash plate 8 rotating with the shaft on bearings 9. The details of the engine do not concern the present invention and further description is not thought to be necessary. The engine shaft 4 is provided with an extension 10 supported by a bearing 11 in an end cover 12 of a casing part 13 which for convenience is formed as a continuation of the engine casing 1. The extension shaft 10 has a threaded portion 14 upon which are threaded two spaced abutment discs 15 and 16 which are adjustable axially and can be secured in adjusted position by locking means, e.g. a clamping bolt as indicated at 17 on the disc 16. The disc 15 is provided with a radial abutment 18 and the disc 16 is provided with a radial abutment 19, both these abutments facing inwardly as seen in FIGURE 1. A nut assembly is rotatably threaded upon the shaft portion 14, has end faces one of which has a single radial abutment 20 and the other of which has a single radial abutment 21 projecting therefrom, these abutments being so disposed that either the abutment 20 can be engaged in locking relation with the abutment 18, or the abutment 21 can be engaged in locking relation with the abutment 19 when the nut assembly is sufficiently close to the respective adjacent disc 15 or 16. The said nut assembly comprises an internally threaded sleeve portion 22 over which is axially slidable a friction plate 23 loaded by a helical spring 24. A flange 25 is secured to the sleeve 22, and between the latter and the flange 25 there is interposed a ring 26 or similarly shaped part which extends at right angles to an arm 27, the ring part 26 being arranged to surround the sleeve 22. The arm 27 is disposed parallel to and spaced from the shaft 10 so as to clear the nut assembly and the disc 16, and has its opposite end slidably engaged with a radially extending portion of a rocker plate 28 mounted for pivotal movement concentric with the shaft 10. The said radial portion of the rocker plate 28 has an axially extending portion 29 of channel cross section in which is received the axially extending portion of the arm 27 so that the latter is engaged at all axial positions of the nut. The rocker plate 28 has oppositely directed lateral extensions 30 and 31 having radial faces which are respectively engageable with the actuating ends 32, 33 of two exhaust or shut-off valves 34, 35 disposed one on each side of the shaft 10. Each valve is arranged so that when closed by actuation of the rocker plate 28 it shuts off the exhaust for one direction of rotation of the engine except for a restricted by-pass passage 36 or 37 through which exhaust can continue at a reduced rate. The size of the said passage is adjustable by means of a stud 38 or 39, so that when the valve is closed the engine can operate only at a reduced speed determined by the size of the restricted orifice.

Control of the direction of rotation of the engine is effected by a suitable valve arrangement which allows pressure fluid to enter through one valve into the operating part of the engine and to escape through a second valve, the fluid flow being reversed through the same pair of valves for rotation in the opposite direction. The arrangement is such that when the engine is started the nut assembly 22–25 is caused to travel along the threaded part 14 of the shaft, being prevented from rotation with the shaft by its frictional engagement with the right angle end 26 of the arm 27 which latter is engaged with the rocker plate 28. Thus, the nut approaches one of the two discs 15 or 16, according to the direction of engine rotation, and eventually the radial abutment 20 or 21 on one end face of the nut engages with the radial abutment 18 or 19 on the disc, thereby partially rotating the nut which takes with it the frictionally engaged arm 27. This movement swings the rocker plate 28 about the shaft and closes the appropriate shut off or exhaust valve 34 or 35, so that exhaust can only continue through the restricted orifices 36 or 37. This action takes place at a suitable time before the engine is stopped by suitable operation of the main control valve arrangement (not shown), and the engine thus continues to operate at a lower speed until it is brought to rest. Upon reversal of the engine, the threaded shaft 14 causes the nut to travel in the opposite direction, disengaging it from the disc and eventually bringing the nut into engagement with the other disc when a similar action takes place to effect partial rotation of the rocker plate in the opposite direction so as to close the second exhaust or shut-off valve which is then in operation. In order to ensure full engagement of the radial abutments on the nut and discs respectively, the discs should be arranged so that on the penultimate revolution of the shaft the nut and disc abutments are just clear, but these abutments are adapted to engage at the end of the final revolution by an amount substantially equal to one lead of the screw thread.

The threaded shaft portion 14 and the rocker plate 28 with its operating mechanism as described above is conveniently enclosed in a sealed chamber 40 forming an extension of the engine casing and carrying the valves. Rotation of the engine is caused by allowing pressure fluid to enter through one valve into the operating part of the engine and to escape through a second valve, the fluid flow being reversed through the same pair of valves for rotation in the opposite direction as previously described.

The invention is not restricted to the example described above, since it may be applied to any fluid-operated engine having a rotary output shaft or member. Also the threaded shaft which drives the displaceable member or nut may be separate from the main engine shaft although in driven connection therewith. Also whilst the invention may be applied with particular advantage to compressed air engines it may be employed with engines operated by other fluids.

I claim:

1. In a fluid-operated engine having a rotary power output member operable for a limited number of revolutions in excess of one revolution and including control means for stopping the engine after such revolutions have been performed, a displaceable control member operatively connected to said output member for displacement corresponding to the engine revolutions, and valve means actuated by said control member when the engine has performed a number of revolutions less than the aforesaid limited number, said valve means being operative upon the engine motive fluid to decrease the speed of the revolutions of the engine prior to the stopping of said engine.

2. An engine according to claim 1 in which the valve means actuated by the control member is an exhaust valve which is partially closed by said actuation.

3. An engine according to claim 1 in which said valve means actuated by the control member is a shut-off valve which is partially closed by said actuation.

4. An engine according to claim 1 in which said valve means actuated by the control member is an exhaust valve which is actuated to closed position, and a restricted by-pass is associated with said exhaust valve, said by-pass being opened when said exhaust valve is closed.

5. An engine according to claim 1 in which said valve means actuated by the control member is a shut-off valve which is actuated to closed position, and a restricted by-pass is associated with said shut-off valve, said by-pass being opened when said shut-off valve is closed.

6. An engine according to claim 1 comprising a threaded shaft driven from the engine output member, a nut threaded on said shaft and constituting the displaceable control member, a valve actuating member, means forming a connection between said nut and said valve actuating member for frictionally restraining said nut against rotation, at least one abutment means on said shaft engageable by the nut at the end of its travel on the shaft, and said connection forming means being arranged to be displaced when the nut engages the abutment and thereby to displace the valve actuating member.

7. An engine according to claim 1 comprising a threaded shaft driven by the engine output member, a nut threaded on said shaft and constituting the displaceable control member, means for frictionally restraining the nut against rotation at least one abutment on the shaft for engagement by the nut at the end of its travel, and means permiting axial adjustment of said abutment on the shaft.

8. An engine according to claim 7, comprising a disc threaded upon said shaft and locking means for securing said disc in adjusted position, the abutment being mounted on said disc.

9. An engine according to claim 1, comprising a threaded shaft driven from the engine output member, a nut threaded on said shaft and constituting the displaceable control member, means for frictionally restraining the nut against rotation, at least one abutment on the shaft for engagement by the nut at the end of its travel, said nut and said abutment having on their respective end faces projecting abutments mutually engageable by rotation of the abutment when the nut reaches the end of its travel.

10. An engine according to claim 1, comprising a threaded shaft driven from the engine output member, a nut threaded on said shaft and constituting the displaceable control member, said nut comprising a sleeve having a radially flanged portion, a plate slidable on said sleeve, a valve actuating member interposed between said flanged portion and said plate, and spring loading means urging said plate towards the flanged portion of the sleeve for frictionally restraining said nut against rotation.

11. An engine according to claim 10 in which said valve actuating member has a right angled portion thereof extending parallel to the shaft, further comprising a rocker plate mounted for pivotal movement concentric with the shaft, and a slidable drive connection between said right angled portion and said rocker plate for actuating the rocker plate from the valve actuating member.

12. An engine according to claim 1, comprising a threaded shaft driven from the engine output member, a nut threaded on said shaft and constituting the displaceable control member, said nut having a radially flanged portion, a plate slidable on said sleeve, an actuating member interposed between said flanged portion and said plate, spring loading means urging said plate towards the flanged portion of the sleeve for frictionally restraining said nut against rotation, a rocker plate mounted for pivotal movement concentric with said shaft, a slidably extensible operative connection between said rocker plate and said actuating member, oppositely directed lateral extensions on said rocker plate, and valves for controlling the engine motive fluid, said valves being disposed to be respectively actuated by the rocker plate extensions by angular displacement of the rocker plate in one or other direction.

13. An engine according to claim 1, comprising a threaded shaft driven from the engine output member, a nut threaded on said shaft and constituting the displaceable control member, means for restraining said nut against rotation, a casing enclosing the engine, and a sealed chamber forming an extension of the engine enclosing casing, said sealed chamber enclosing the threaded shaft.

References Cited in the file of this patent

UNITED STATES PATENTS 2,704,054   Nordenstam _____ Mar. 15, 1955